(12) United States Patent
Chuang et al.

(10) Patent No.: US 7,944,606 B2
(45) Date of Patent: May 17, 2011

(54) DISPLAY DEVICE

(75) Inventors: Kai-Cheng Chuang, Hsinchu (TW); Tzu-Ming Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 12/500,752

(22) Filed: Jul. 10, 2009

(65) Prior Publication Data
US 2010/0225996 A1    Sep. 9, 2010

(30) Foreign Application Priority Data
Mar. 4, 2009   (TW) ............................... 98107041 A

(51) Int. Cl.
*G02B 26/00*   (2006.01)

(52) U.S. Cl. ....................................... 359/296; 359/253

(58) Field of Classification Search .................... 359/296
See application file for complete search history.

(56) References Cited

U.S. PATENT DOCUMENTS
2003/0048521 A1*  3/2003  Ikeda et al. .................. 359/296
2004/0125433 A1*  7/2004  Matsuda et al. .............. 359/296
2004/0136048 A1*  7/2004  Arango et al. ................ 359/296

* cited by examiner

*Primary Examiner* — Ricky L Mack
*Assistant Examiner* — James C Jones
(74) *Attorney, Agent, or Firm* — Chun-Ming Shih

(57) ABSTRACT

A display device includes a first substrate, a second substrate, a partition element disposed between the first and the second substrates, a dielectric liquid and a plurality of dielectrophoretic particles. The first substrate includes a base having surface and an electrode layer being disposed on the surface and having at least one electrode. The partition element forms at least one accommodating room between the first and the second substrates. The electrode is adapted to forming an electric field in the accommodating room. A plurality of sections of the electrode parallel to the surface are gradually reduced in a direction towards the second substrate. The dielectric liquid is disposed in the accommodating room and has a first dielectric constant. The dielectrophoretic particles are dispersed in the dielectric liquid. Each of the dielectrophoretic particles has a color and a second dielectric constant different from the first dielectric constant.

4 Claims, 9 Drawing Sheets

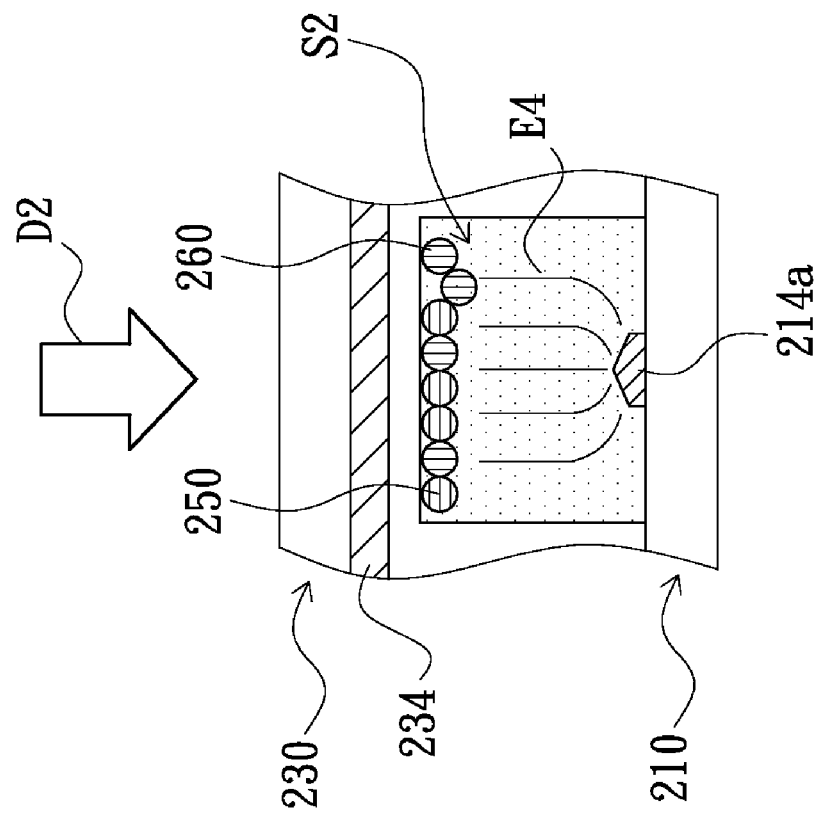
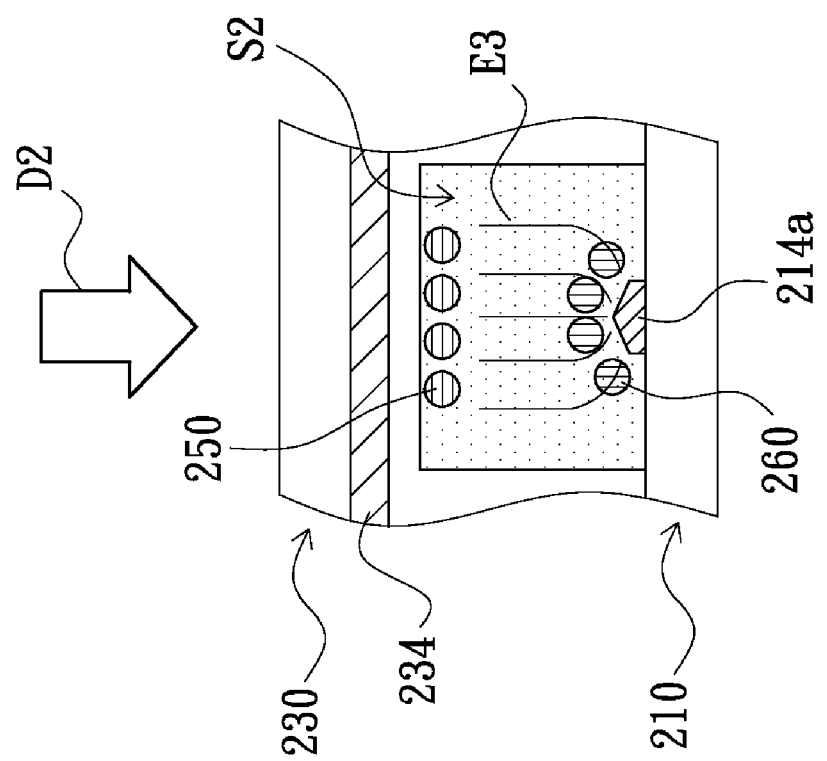

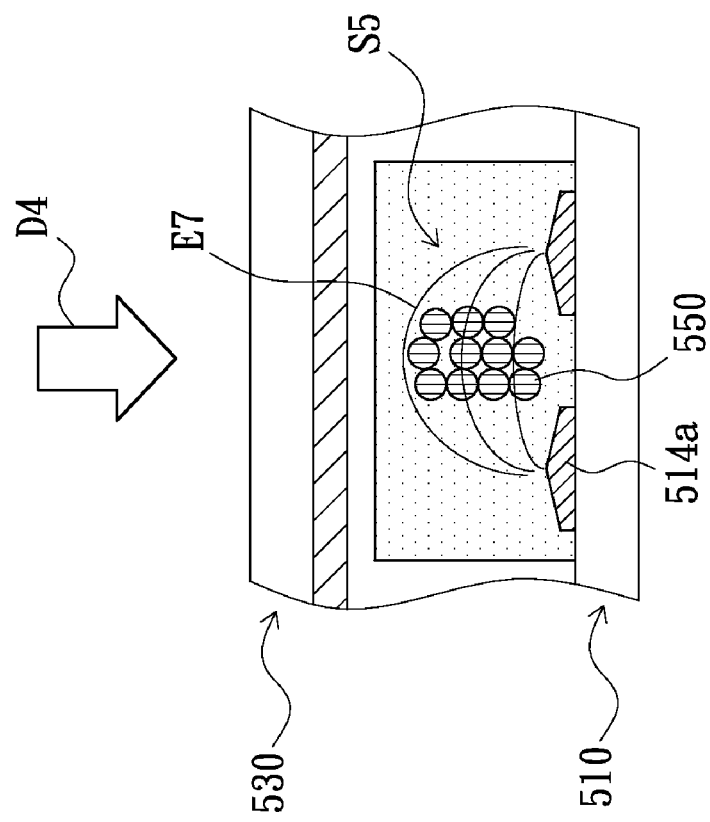
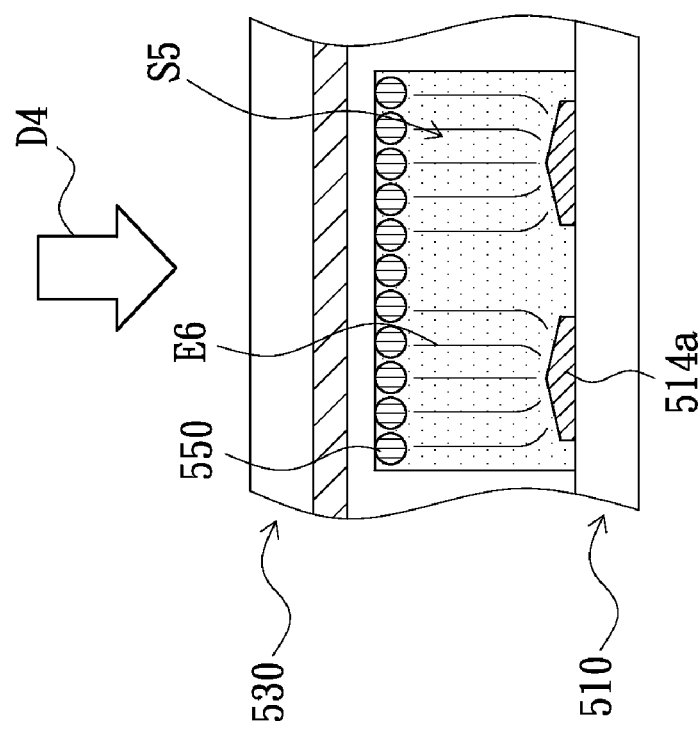

DISPLAY DEVICE

BACKGROUND

This application claims priority to a Taiwan application No. 098107041 filed on Mar. 4, 2009.

FIELD OF THE INVENTION

The present invention relates to a display device and in particular, to a display device applying the theory of dielectrophoresis.

DESCRIPTION OF THE PRIOR ART

FIG. 1 is a schematic cross-sectional view of a conventional display device. Referring to FIG. 1, the conventional display device 100 includes a first substrate 110, a partition element 120, a second substrate 130, a dielectric liquid 140 and a plurality of dielectrophoretic particles 150. The first substrate 110 includes a first base 112 and a first electrode layer 114. The first electrode layer 114 is disposed on the first base 112 and has a plurality of white first electrodes 114a. Each of the first electrodes 114a is a rectangular parallelepiped and the partition element 120 is disposed on the first substrate 110.

The second substrate 130 is disposed on the partition element 120. The partition element 120 forms a plurality of accommodating rooms S1 between the first substrate 110 and the second substrate 130. Each of the accommodating rooms S1 can be regarded as a pixel unit. The second substrate 130 includes a second base 132 and a second electrode layer 134 and the second electrode layer 134 is disposed on the second base 132.

The dielectric liquid 140 is disposed in the accommodating rooms S1. The dielectric liquid 140 which is transparent has a first dielectric constant. The dielectrophoretic particles 150 are dispersed in the dielectric liquid 140. The dielectrophoretic particles 150 are black and each of the dielectrophoretic particles 150 has a second dielectric constant which is smaller than the first dielectric constant.

FIG. 2A is a schematic cross-sectional view of one of pixel units of the display device of FIG. 1 which is in a first operation state. FIG. 2B is a schematic cross-sectional view of one of pixel units of the display device of FIG. 1 which is in a second operation state. Referring to FIG. 2A, as for the accommodating rooms S1, i.e. the pixel unit, when the pixel unit is in the first operation state, the first substrate 110 and the second substrate 130 form a non-uniform electric field E1 in the accommodating room S1 and the dielectrophoretic particles 150 move toward an area where the intensity of the electric field E1 is low. Meanwhile, the dielectrophoretic particles 150 cover the first electrodes 114a, so that the pixel unit appears black as viewed along the direction D1 shown in FIG. 2A.

Referring to FIG. 2B, as for the above accommodating rooms S1, when the pixel unit is in the second operation state, the first substrate 110 forms another non-uniform electric field E2 in the accommodating room S1 and the dielectrophoretic particles 150 move toward an area where the intensity of the electric field E2 is low. Meanwhile, the dielectrophoretic particles 150 do not cover the first electrodes 114a, so that the pixel unit appears white as viewed along the direction D1 shown in FIG. 2B.

However, each of the first electrodes 114a of the first substrate 110 of the conventional display device 100 is a rectangular parallelepiped, so the non-uniformity of the electric field E1 generated between each of the first electrodes 114a and the second electrode layer 134 is relatively low when the above pixel unit is in the first operation state (shown in FIG. 2A). That is, the difference between the electric field intensity near each of the first electrodes 114a and the electric field intensity near the second electrode layer 134 is comparatively small when the above pixel unit is in the first operation state (shown in FIG. 2A). Thus, the dielectrophoresis force born by each of the dielectrophoretic particles 150 of the conventional display device 100 is relatively small so that the moving speed of each of the dielectrophoretic particles is relatively slow.

BRIEF SUMMARY

The present invention is directed to provide a display device in which the non-uniformity of the electric field is relatively high during operation of the display device.

The present invention provides a display device including a first substrate, a partition element, a second substrate, a dielectric liquid and a plurality of first dielectrophoretic particles. The first substrate includes a first base and a first electrode layer. The first base has a surface. The first electrode layer is disposed on the surface and has at least one first electrode. The partition element is disposed on the first substrate. The second substrate is disposed on the partition element. The partition element forms at least one accommodating room between the surface of the first base and the second substrate. The first electrode is adapted to forming an electric field in the accommodating room. A plurality of sections of the first electrode parallel to the surface of the first base are gradually reduced in a direction towards the second substrate. The dielectric liquid is disposed in the accommodating room and has a first dielectric constant. The first dielectrophoretic particles are dispersed in the dielectric liquid. Each of the dielectrophoretic particles has a first color and a second dielectric constant different from the first dielectric constant.

In one embodiment of the present invention, the second substrate includes a second base and a second electrode layer and the second electrode layer is disposed on the second base.

In one embodiment of the present invention, the display device further includes a plurality of electrophoretic particles. The electrophoretic particles are dispersed in the dielectric liquid. Each of the electrophoretic particles has a second color different from the first color.

In one embodiment of the present invention, the display device further includes a plurality of second dielectrophoretic particles. The second dielectrophoretic particles are dispersed in the dielectric liquid. Each of the second dielectrophoretic particles has a second color and a third dielectric constant. The second color is different from the first color. The second dielectric constant is larger than the first dielectric constant and the third dielectric constant is smaller than the first dielectric constant. The shape of each of the second dielectrophoretic particles is different from the shape of each of the first dielectrophoretic particles.

In one embodiment of the present invention, one of each of the first dielectrophoretic particles and each of the second dielectrophoretic particles is stick-shaped and the other of each of the first dielectrophoretic particles and each of the second dielectrophoretic particles is ball-shaped.

In one embodiment of the present invention, the first electrode has a second color and the second color is different from the first color.

In the present invention, because the sections of the first electrode parallel to the surface of the first base are gradually reduced in the direction towards the second substrate, so the non-uniformity of the electric field generated by the first electrode is relatively high. That is, the difference between the electric field intensity near the first electrode and the electric field intensity far from the first electrode is relatively large. Thus, as compared to the conventional art, the dielectrophoresis force born by each of the dielectrophoretic particles of the display device of the embodiment of the present invention is relatively large so that the moving speed of each of the dielectrophoretic particles is relatively fast.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

FIG. 4A is a schematic cross-sectional view of one of pixel units of the display device of FIG. 3 which is in a first operation state.

FIG. 4B is a schematic cross-sectional view of one of pixel units of the display device of FIG. 3 which is in a second operation state.

FIG. 9A is a schematic cross-sectional view of one of pixel units of the display device of FIG. 8 which is in a first operation state.

FIG. 9B is a schematic cross-sectional view of one of pixel units of the display device of FIG. 8 which is in a second operation state.

DETAILED DESCRIPTION

Reference will now be made to the drawings to describe exemplary embodiments of the present invention, in detail. The following description is given by way of example, and not limitation.

First Embodiment

Figure 1:
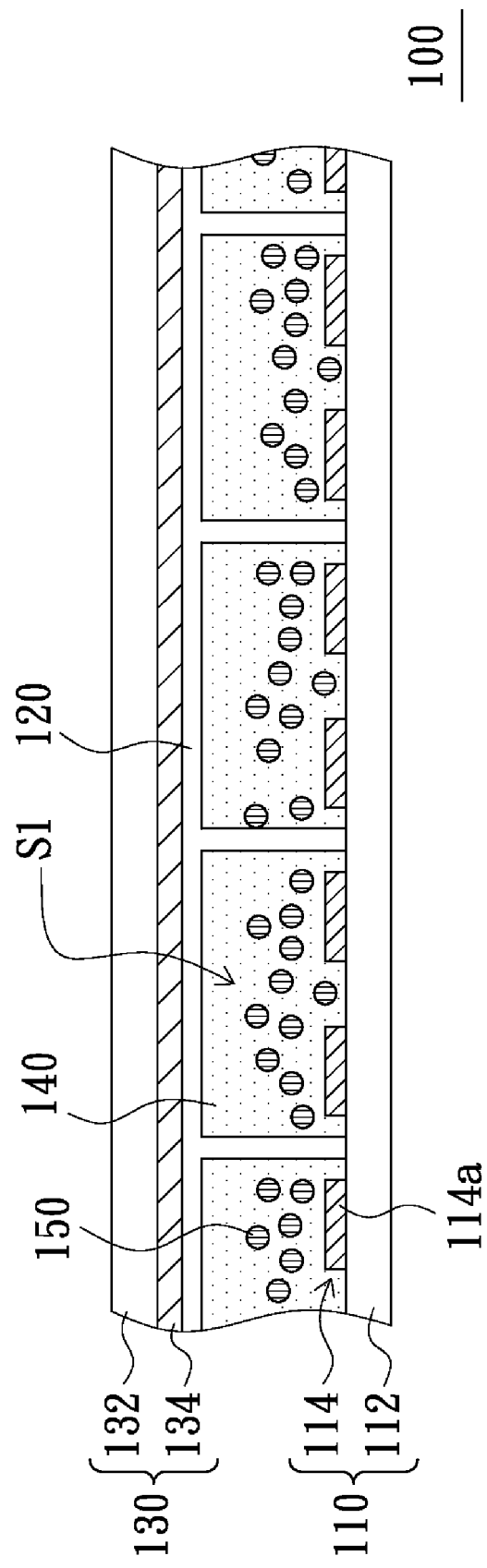
FIG. 1 is a schematic cross-sectional view of a conventional display device.
Figure 2B:
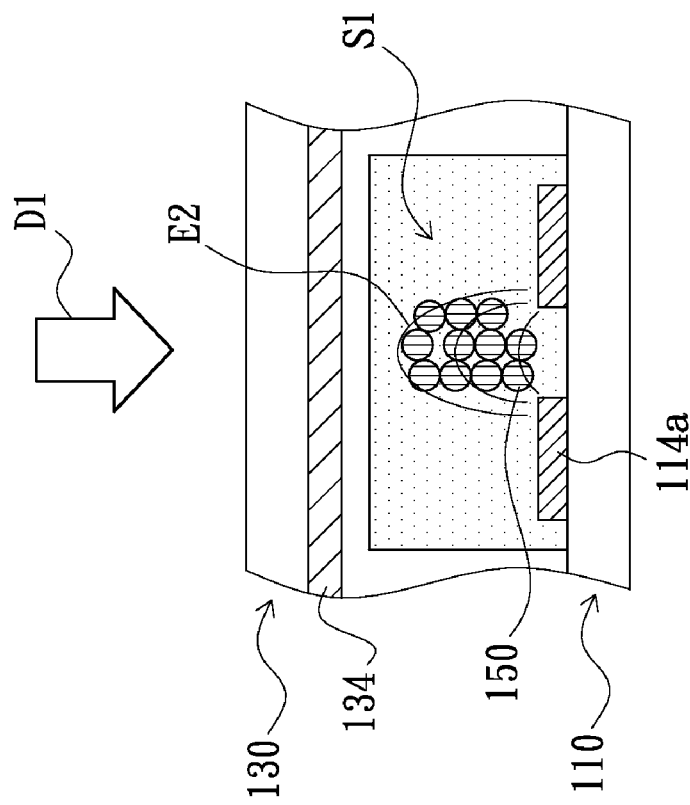
FIG. 2B is a schematic cross-sectional view of one of pixel units of the display device of FIG. 1 which is in a second operation state.
Figure 2A:
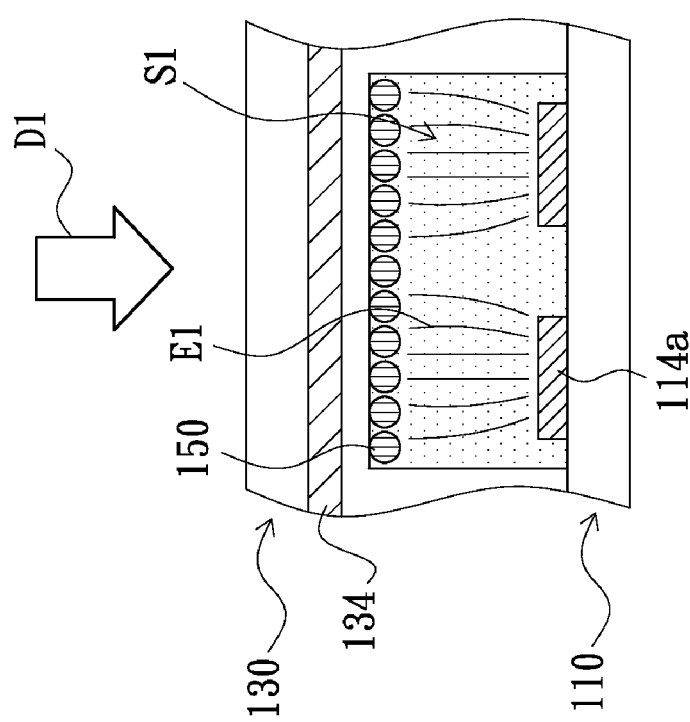
FIG. 2A is a schematic cross-sectional view of one of pixel units of the display device of FIG. 1 which is in a first operation state.
Figure 3:
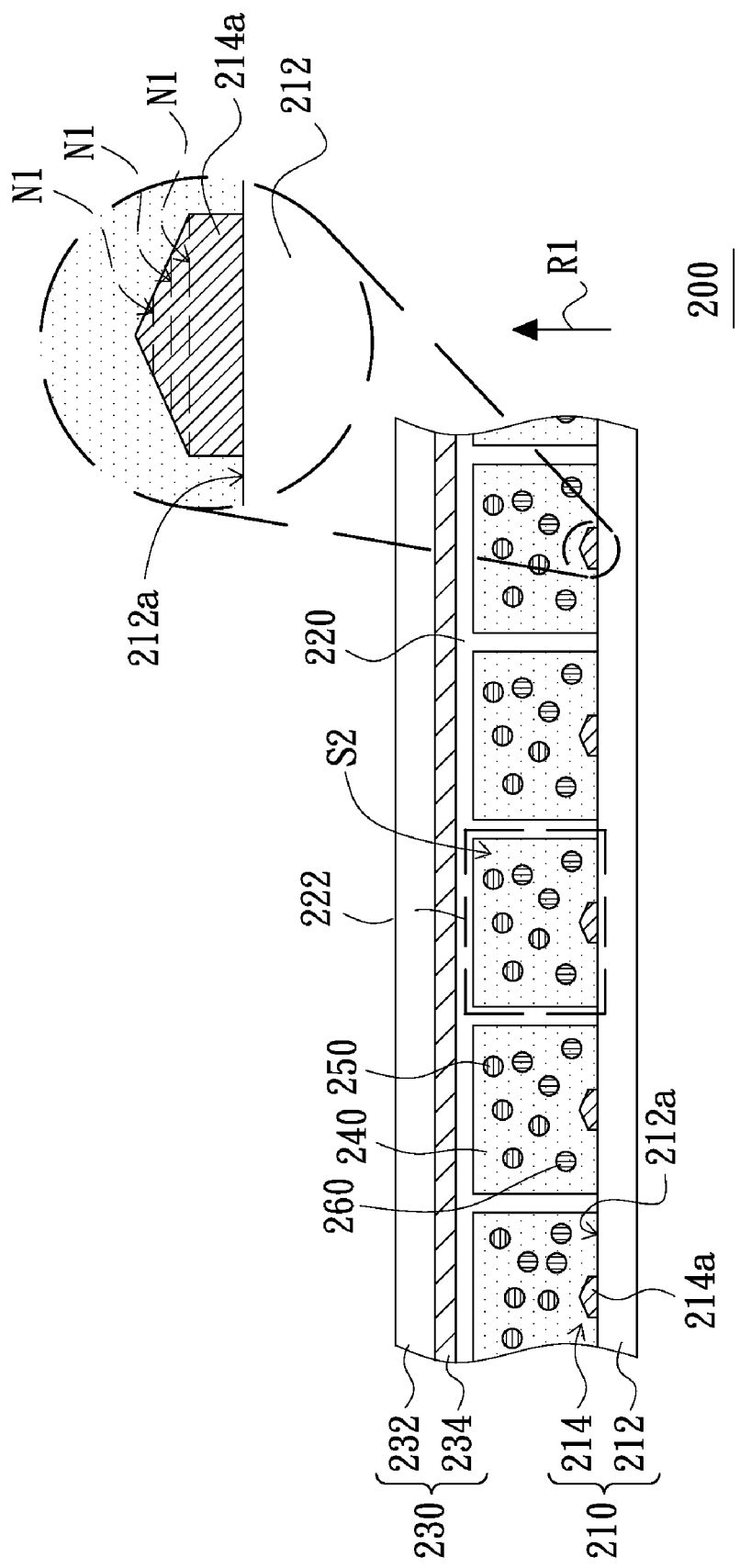
FIG. 3 is a schematic cross-sectional view of a display device of a first embodiment of the present invention.

FIG. 3 is a schematic cross-sectional view of a display device of a first embodiment of the present invention. Referring to FIG. 3, the display device 200 includes a first substrate 210, a partition element 220, a second substrate 230, a dielectric liquid 240, a plurality of dielectrophoretic particles 250 and a plurality of electrophoretic particles 260. The first substrate 210 includes a first base 212 and a first electrode layer 214. The first electrode layer 214 is disposed on a surface 212a of the first base 212 and includes a plurality of first electrodes 214a. The partition element 220 is disposed on the first substrate 210.

The second substrate 230 is disposed on the partition element 220. The partition element 220 forms a plurality of accommodating rooms S2 between the surface 212a of the first base 212 and the second substrate 230. In this embodiment, the surface 212a of the first base 212 faces the second substrate 230. The partition element 220, for example, includes a plurality of microcups 222 and the partition element 220 may be disposed on the surface 212a of the first base 212. Each of the accommodating rooms S2 can be regarded as a pixel unit and disposed within a corresponding microcup 222. It should be noted that, a plurality of sections N1 of each of the first electrodes 214a parallel to the surface 212a of the first base 212 are gradually reduced in a direction R1 towards the second substrate 230.

The first substrate 230 includes a second base 232 and a second electrode layer 234 and the second electrode layer 234 is disposed on the second base 232. The first electrodes 214a of the first substrate 210 or the second electrode layer 234 of the second substrate 230 are adapted to forming electric field in the accommodating rooms S2. The details will be described hereinafter.

The dielectric liquid 240 is disposed in the accommodating rooms S2. The dielectric liquid 240 which is transparent has a first dielectric constant. The dielectrophoretic particles 250 are dispersed in the dielectric liquid 240. Each of the dielectrophoretic particles 250 has a first color and a second dielectric constant and the second dielectric constant is different from the first dielectric constant. In this embodiment, the second dielectric constant is smaller than the first dielectric constant. The electrophoretic particles 260 are dispersed in the dielectric liquid 240. Each of the electrophoretic particles 260 has a second color and the second color is different from the first color. In this embodiment, each of the electrophoretic particles 260 is, for example, charged with positive electrical charges.

FIG. 4A is a schematic cross-sectional view of one of pixel units of the display device of FIG. 3 which is in a first operation state. FIG. 4B is a schematic cross-sectional view of one of pixel units of the display device of FIG. 3 which is in a second operation state. Referring to FIG. 4A, as for the accommodating rooms S2, i.e. the pixel unit, when the pixel unit is in the first operation state, the first substrate 210 and the second substrate 230 form a non-uniform electric field E3 in the accommodating room S2 and the voltage of the first electrode 214a is smaller than the voltage of the second electrode layer 234. Meanwhile, the dielectrophoretic particles 250 move toward an area where the intensity of the electric field E3 is low and which is near the second substrate 230, and the electrophoretic particles 260 move toward the first substrate 214a. As a result, the pixel unit appears the first color as viewed along the direction D2 shown in FIG. 4A.

Referring to FIG. 4B, as for the above accommodating room S2, when the pixel unit is in the second operation state, the first substrate 210 and the second substrate 230 form an non-uniform electric field E4 in the accommodating room S2 and the voltage of the first electrode 214a is larger than the voltage of the second electrode layer 234. Meanwhile, the dielectrophoretic particles 250 move toward an area where the intensity of the electric field E4 is low and which is near the second substrate 230, and the electrophoretic particles 260 move toward the second electrode layer 234. As a result, the pixel unit appears the hybrid color mixed with the first color and the second color as viewed along the direction D2 shown in FIG. 4B.

As mentioned above, as shown in FIG. 3, because the sections N1 of each of the first electrodes 214a parallel to the surface 212a of the first base 212 are gradually reduced in the direction R1 towards the second substrate 230, so the non-uniformity of the electric field generated between each of the first electrodes 214a and the second electrode layer 234 is relatively high. That is, the difference between the electric field intensity near each of the first electrodes 214a and the electric field intensity near the second electrode layer 234 of the second substrate 230 is relatively large. Thus, as compared to the conventional art, the dielectrophoresis force born by each of the dielectrophoretic particles 250 of the display device 200 of the present embodiment is relatively large so that the moving speed of each of the dielectrophoretic particles is relatively fast.

Second Embodiment

Figure 5:
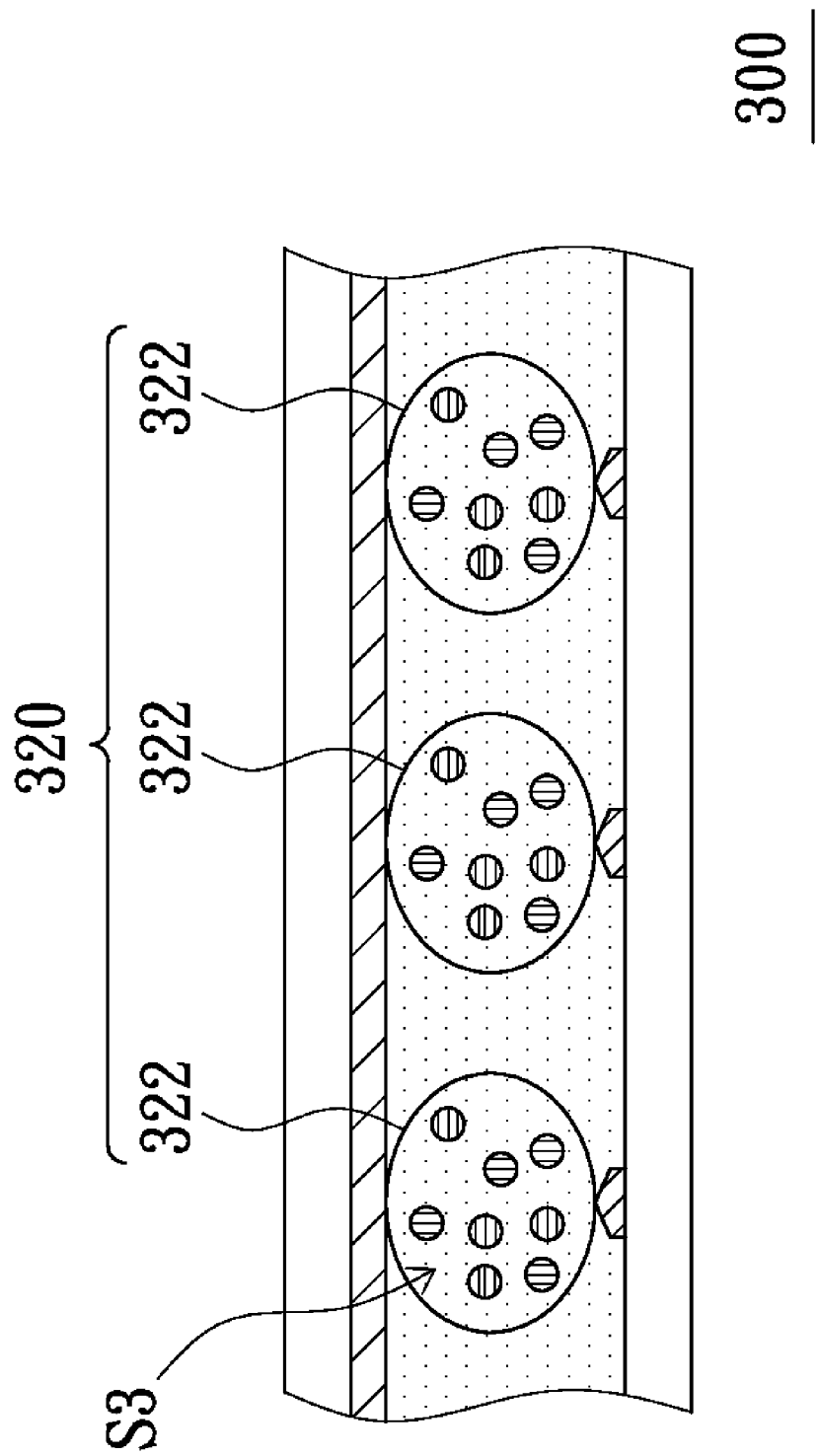
FIG. 5 is a schematic cross-sectional view of a display device of a second embodiment of the present invention.

FIG. 5 is a schematic cross-sectional view of a display device of a second embodiment of the present invention. Referring to FIG. 5, the difference between the display device 300 of the second embodiment and the display device 200 of the first embodiment is that the partition element 320 of the display device 300 includes a plurality of microcapsules 322 and each of the accommodating rooms S3 is disposed within the corresponding microcapsule 322.

Third Embodiment

Figure 6:
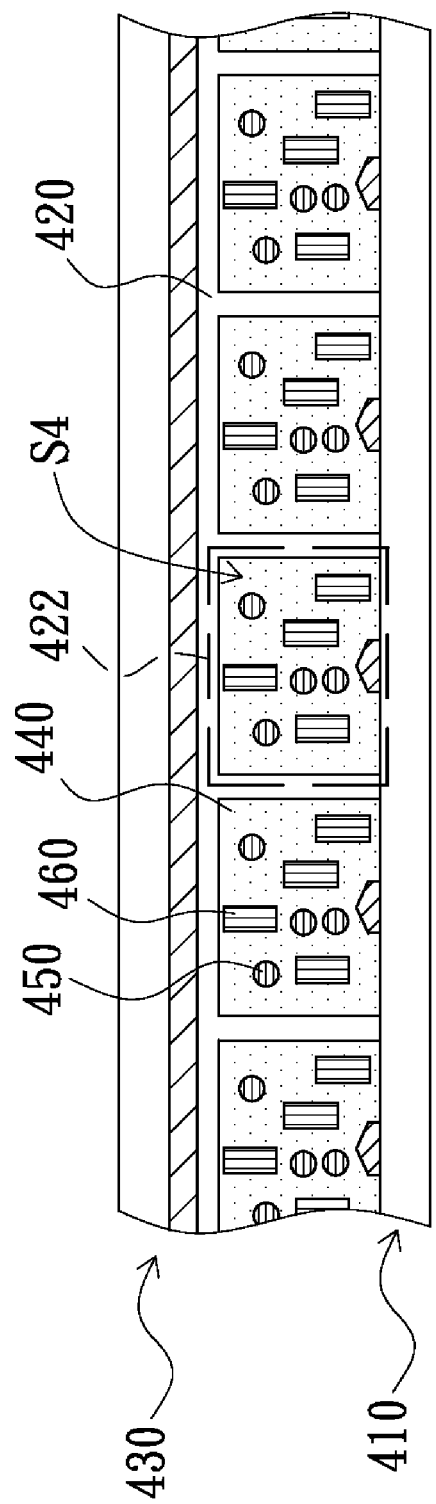
FIG. 6 is a schematic cross-sectional view of a display device of a third embodiment of the present invention.

FIG. 6 is a schematic cross-sectional view of a display device of a third embodiment of the present invention. Referring to FIG. 6, the difference between the display device 400 of the third embodiment and the display device 200 of the first embodiment is that the display device 400 includes a plurality of first dielectrophoretic particles 450 and a plurality of second dielectrophoretic particles 460. The dielectric liquid 440 is disposed in the accommodating rooms S4 and has a first dielectric constant. The first dielectrophoretic particles 450 and the second dielectrophoretic particles 460 are dispersed in the dielectric liquid 440.

Each of the first dielectrophoretic particles 450 has a first color and a second dielectric constant and the second dielectric constant is larger than the first dielectric constant. Each of the second dielectrophoretic particles 460 has a second color and a third dielectric constant. The second color is different from the first color and the third dielectric constant is smaller than the first dielectric constant. The shape of each of the second dielectrophoretic particles 460 such as a shape of a stick is different from the shape of each of the first dielectrophoretic particles 450 such as a shape of a ball. In the present embodiment, the second dielectrophoretic particles 460 which are stick-shaped can be more easily polarized than the first dielectrophoresis particles 450 which are ball-shaped.

Figure 7B:
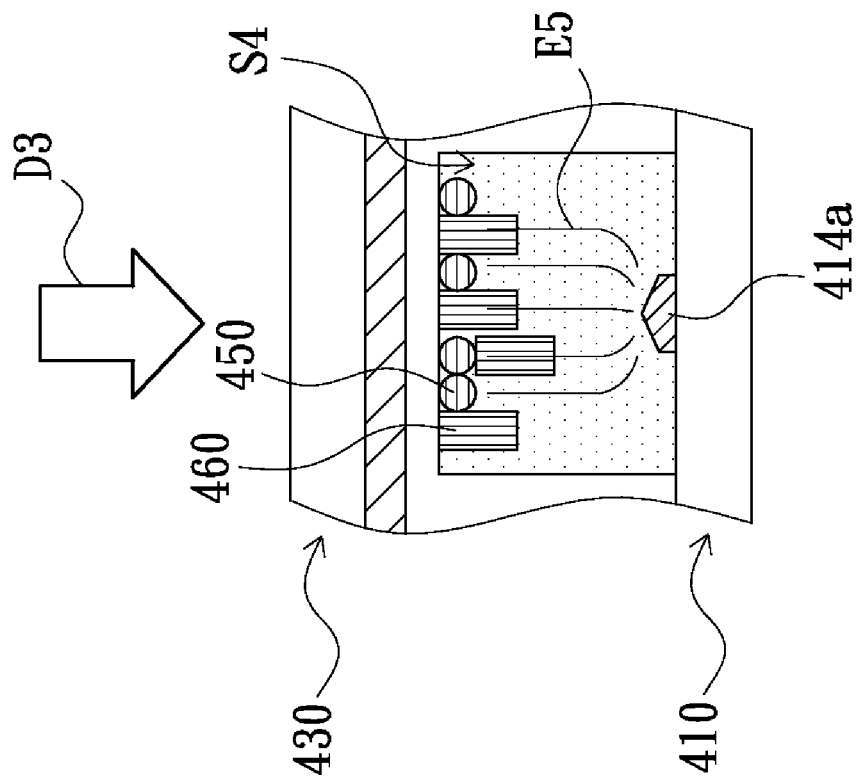
FIG. 7B is a schematic cross-sectional view of one of pixel units of the display device of FIG. 6 which is in a second operation state.
Figure 7A:
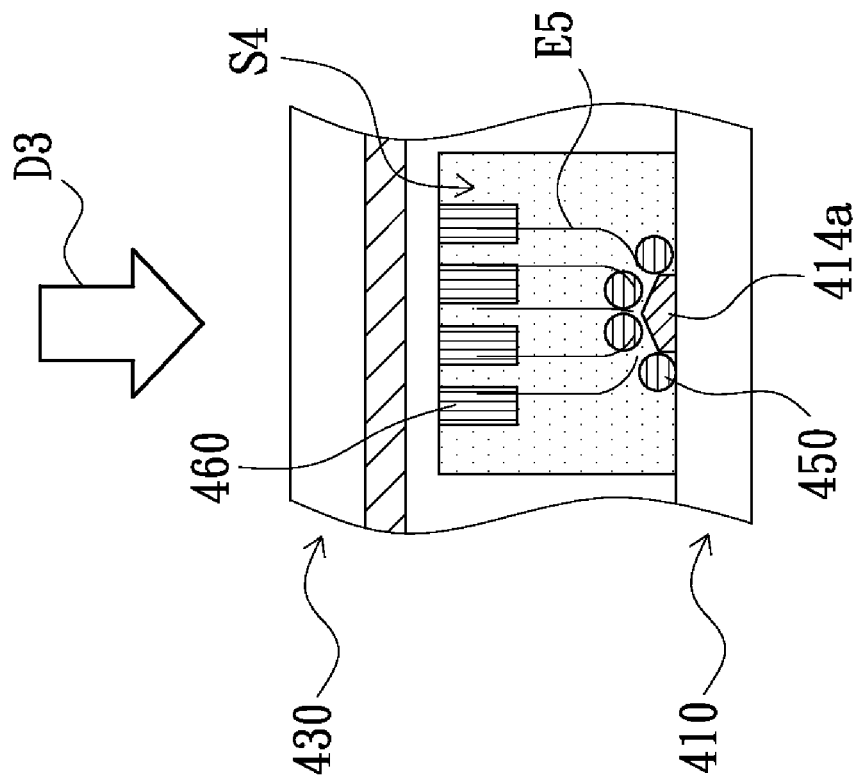
FIG. 7A is a schematic cross-sectional view of one of pixel units of the display device of FIG. 6 which is in a first operation state.

FIG. 7A is a schematic cross-sectional view of one of pixel units of the display device of FIG. 6 which is in a first operation state. FIG. 7B is a schematic cross-sectional view of one of pixel units of the display device of FIG. 6 which is in a second operation state. Referring to FIG. 7A, as for the accommodating rooms S4, i.e. the pixel unit, when the pixel unit is in the first operation state, the first substrate 410 and the second substrate 430 form a non-uniform electric field E5 in the accommodating room S4 and the first driving frequency of the display 400 is low. Meanwhile, the direction of the dielectrophoresis force born by each of the second dielectrophoretic particles 460 and the direction of the dielectrophoresis force born by each of the first dielectrophoretic particles 450 are reverse. The second dielectrophoretic particles 460 move toward an area where the intensity of the electric field E5 is low and which is near the second substrate 430 and the first electrophoretic particles 450 move toward an area where the intensity of the electric field E5 is high and which is near the first electrode 414a of the first substrate 410. At this time, the pixel unit appears the second color as viewed along the direction D3 shown in FIG. 7A.

Referring to FIG. 7B, as for the above accommodating rooms S4, when the pixel unit is in the second operation state, the first substrate 410 and the second substrate 430 form the non-uniform electric field E5 in the accommodating rooms S4 and the second driving frequency of the display device 400 is higher than the first driving frequency. Meanwhile, the dielectrophoresis force born by each of the first dielectrophoretic particles 450 is transformed to negative dielectrophoresis force (n-DEP force) from positive dielectrophoresis force (p-DEP force). The second dielectrophoretic particles 460 and the first dielectrophoretic particles 450 move toward the area where the intensity of the electric field E5 is low. At this time, the pixel unit appears the hybrid color mixed with the first color and the second color as viewed along the direction D3 shown in FIG. 7B.

Furthermore, it should be noted that the microcups 422 of the partition element 420 (shown in FIG. 6) of this embodiment can be replaced by microcapsules (similar to that of the second embodiment) and not shown in figures.

Fourth Embodiment

Figure 8:
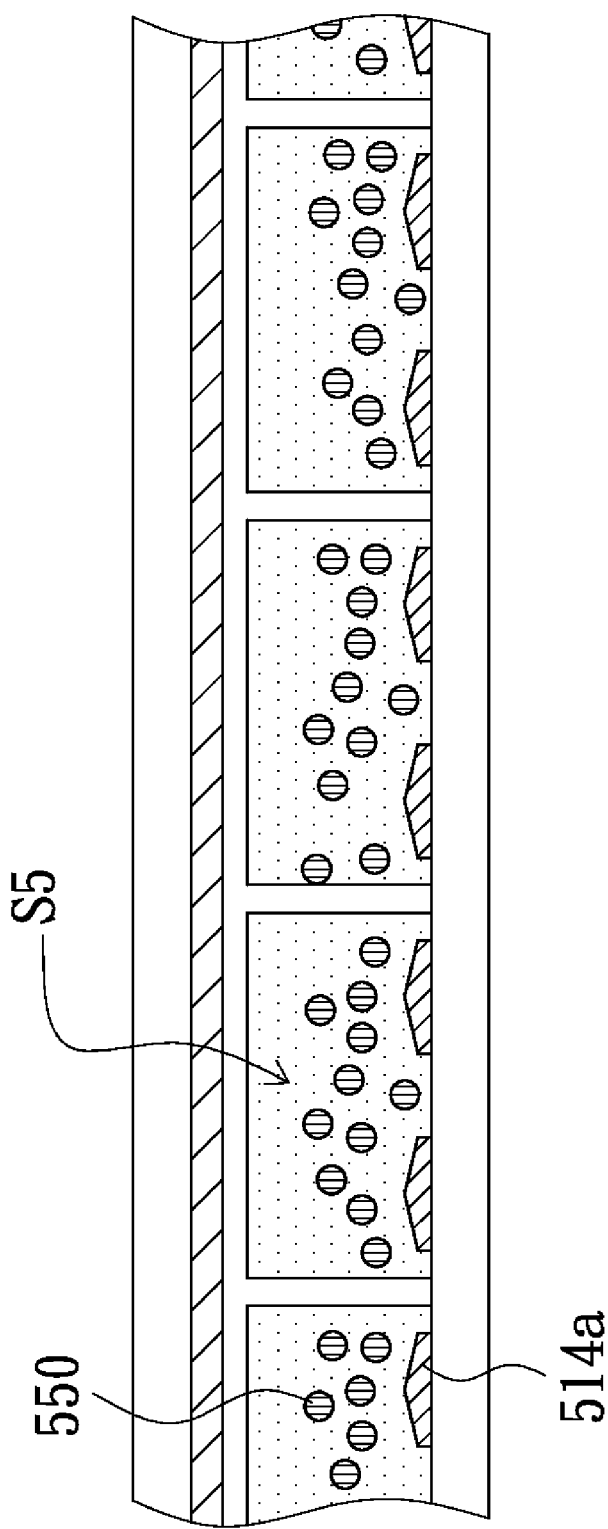
FIG. 8 is a schematic cross-sectional view of a display device of a fourth embodiment of the present invention.

FIG. 8 is a schematic cross-sectional view of a display device of a fourth embodiment of the present invention. Referring to FIG. 8, the difference between the display device 500 of the fourth embodiment and the display device 200 of the first embodiment is that the electrophoretic particles 260 (shown in FIG. 3) are omitted in the display device 500 and that more first electrodes 514a are disposed in each of the accommodating rooms S5. In this embodiment, each of the dielectrophoretic particles 550 has a first color and each of the first electrodes 514a has a second color. The second color is different from the first color.

FIG. 9A is a schematic cross-sectional view of one of pixel units of the display device of FIG. 8 which is in a first operation state. FIG. 9B is a schematic cross-sectional view of one of pixel units of the display device of FIG. 8 which is in a second operation state. Referring to FIG. 9A, as for the accommodating rooms S5, i.e. the pixel unit, when the pixel unit is in the first operation state, the first substrate 510 and the second substrate 530 form a non-uniform electric field E6 in the accommodating room S5 and the dielectrophoretic particles 550 move toward an area where the intensity of the electric field E6 is low. Meanwhile, the dielectrophoretic particles 550 cover the first electrodes 514a, so that the pixel unit appears the first color as viewed along the direction D4 shown in FIG. 9A.

Referring to FIG. 9B, as for the above accommodating rooms S5, when the pixel unit is in the second operation state, the first electrodes 514a of the first substrate 510 form another non-uniform electric field E7 in the accommodating room S5 and the dielectrophoretic particles 550 move toward an area where the intensity of the electric field E7 is low. Meanwhile, the dielectrophoretic particles 550 do not cover the first electrodes 514a, so that the pixel unit appears the second color as viewed along the direction D4 shown in FIG. 9B.

According to the mentioned above, the display device of the embodiment of the present invention has at least one of the following or other advantages. Because the sections of the first electrode parallel to the surface of the first substrate are gradually reduced in the direction towards the second substrate, so the non-uniformity of the electric field generated by each of the first electrodes is relatively high. That is, the difference between the electric field intensity near each of the first electrodes and the electric field intensity far from the same first electrode is relatively large. Thus, as compared to the conventional art, the dielectrophoresis force born by each of the dielectrophoretic particles of the display device of the embodiment of the present invention is relatively large so that the moving speed of each of the dielectrophoretic particles is relatively fast.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display device comprising:
    a first substrate comprising:
       a first base having a surface; and
       a first electrode layer disposed on the surface and having at least one first electrode;
    a partition element disposed on the first substrate;
    a second substrate disposed on the partition element, wherein the partition element forms at least one accommodating room between the surface of the first base and the second substrate, the first electrode is adapted to forming an electric field in the accommodating room, and a plurality of sections of the first electrode parallel to the surface of the first base are gradually reduced in a direction towards the second substrate;
    a dielectric liquid disposed in the accommodating room, wherein the dielectric liquid has a first dielectric constant;
    a plurality of first dielectrophoretic particles dispersed in the dielectric liquid, each of the first dielectrophoretic particles having a first color and a second dielectric constant different from the first dielectric constant; and
    a plurality of electrophoretic particles dispersed in the dielectric liquid, wherein each of the electrophoretic particles has a second color and the second color is different from the first color.

2. The display device as claimed in claim 1, wherein the second substrate comprises a second base and a second electrode layer and the second electrode layer is disposed on the second base.

3. A display device comprising:
    a first substrate comprising:
       a first base having a surface; and
       a first electrode layer disposed on the surface and having at least one first electrode;
    a partition element disposed on the first substrate;
    a second substrate disposed on the partition element, wherein the partition element forms at least one accommodating room between the surface of the first base and the second substrate, the first electrode is adapted to forming an electric field in the accommodating room, and a plurality of sections of the first electrode parallel to the surface of the first base are gradually reduced in a direction towards the second substrate;
    a dielectric liquid disposed in the accommodating room, wherein the dielectric liquid has a first dielectric constant;
    a plurality of first dielectrophoretic particles dispersed in the dielectric liquid, each of the first dielectrophoretic particles having a first color and a second dielectric constant different from the first dielectric constant; and
    a plurality of second dielectrophoretic particles dispersed in the dielectric liquid, wherein each of the second dielectrophoretic particles has a second color and a third dielectric constant, the second color is different from the first color, the second dielectric constant is larger than the first dielectric constant, the third dielectric constant is smaller than the first dielectric constant, and the shape of each of the second dielectrophoretic particles is different from the shape of each of the first dielectrophoretic particles.

4. The display device as claimed in claim 3, wherein one of each of the first dielectrophoretic particles and each of the second dielectrophoretic particles is stick-shaped and the other of each of the first dielectrophoretic particles and each of the second dielectrophoretic particles is ball-shaped.

* * * * *